(12) United States Patent
Allibhoy et al.

(10) Patent No.: US 7,725,910 B2
(45) Date of Patent: May 25, 2010

(54) INTERACTIVE BROADCAST SYSTEM AND METHOD WITH DIFFERENT CONTENT DISPLAYED TO DIFFERENT VIEWERS

(75) Inventors: Nizar Allibhoy, Northridge, CA (US); Nicholas Cross Wodtke, Santa Monica, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 2011 days.

(21) Appl. No.: 10/134,203

(22) Filed: Apr. 25, 2002

(65) Prior Publication Data

US 2003/0009755 A1 Jan. 9, 2003

Related U.S. Application Data

(60) Provisional application No. 60/288,365, filed on May 3, 2001.

(51) Int. Cl.
| H04N 7/10 | (2006.01) |
| H04N 7/025 | (2006.01) |
| H04N 5/222 | (2006.01) |
| A63F 7/04 | (2006.01) |
| A63F 9/00 | (2006.01) |
| A63F 9/18 | (2006.01) |

(52) U.S. Cl. .............................. 725/32; 725/34; 725/35; 348/722; 273/153 R; 273/429; 273/430; 273/431

(58) Field of Classification Search .................... 725/32, 725/34, 35; 348/722, 844; 273/153 R, 429, 273/430, 431
See application file for complete search history.

(56) References Cited

U.S. PATENT DOCUMENTS 5,559,549 A * 9/1996 Hendricks et al. ............. 725/50
5,916,024 A * 6/1999 Von Kohorn .................. 463/40
6,198,509 B1 3/2001 Dougherty et al.
6,813,775 B1 * 11/2004 Finseth et al. .................. 725/46
6,895,170 B1 * 5/2005 Lambert et al. ................ 386/95
2002/0078441 A1 * 6/2002 Drake et al. .................... 725/9
2002/0100042 A1 * 7/2002 Khoo et al. .................... 725/34
2002/0104083 A1 * 8/2002 Hendricks et al. ............. 725/34

OTHER PUBLICATIONS

The Wink System—www.wink.com; Wink Communications, Alameda California 94501—10 pages from webpage.
TruSync System—www.spiderdance.com—Spiderdance, Inc. 1999-2002—3 pages from webpage.
GoldPocket Interactive—www.goldpocket.com—Goldpocket Interactive 2001 2 pages from webpage.

* cited by examiner

*Primary Examiner*—Hoang-Vu A Nguyen-Ba
(74) *Attorney, Agent, or Firm*—Samuel S. Lee; Procopio, Cory, Hargreaves & Savitch LLP

(57) ABSTRACT

In a system and method for providing a television broadcast that displays different content for different viewers, a pool of content items, or particular items from a pool of content items is/are integrated with a signal for a television program. The combined signal is transmitted or broadcast in any suitable way, such as by satellite, antenna, cable, or the like. Once the combined signal has been transmitted, or while the signal is being transmitted, different items from the pool of content items are displayed to different viewers. The items may be displayed to viewers during a broadcast of a pre-recorded television program. Rules may be integrated into the combined signal governing how and when items from the pool of content items are displayed. The rules may also govern which items from the pool of content items are displayed. A return channel may be provided so that a viewer may communicate to a content provider.

41 Claims, 3 Drawing Sheets

INTERACTIVE BROADCAST SYSTEM AND METHOD WITH DIFFERENT CONTENT DISPLAYED TO DIFFERENT VIEWERS

CROSS-REFERENCE TO RELATED APPLICATIONS

This application claims priority from U.S. Provisional Application Ser. No. 60/288,365, filed May 3, 2001, the contents of which are incorporated by reference. Embodiments of the present invention relate to a U.S. Utility patent application entitled "System and Method For Awarding Prizes," Ser. No. 10/134,156, filed Apr. 25, 2002, the contents of which are incorporated by reference herein.

BACKGROUND

1. Field of the Invention

The present invention relates, generally, to a system and method for integrating additional content into a broadcast of a pre-recorded television program such that different content is displayed to different viewers, and, in particular embodiments, by way of example, for integrating different puzzles into a broadcast of a pre-recorded game show that are displayed for different viewers, to give each viewer or player a potentially unique game-playing experience.

2. Description of Related Art

Television traditionally has been a one-way communication link from a content provider, such as a television network, to a television viewer. Television shows, such as news broadcasts, situation comedies, and game shows, are generally pre-recorded and broadcast at a later time. Even sporting events, which are often broadcast live, may be recorded and broadcast at a later time. Since programs are often pre-recorded, a content provider may broadcast a pre-recorded program in the same time slot, for example, 7:00 p.m. to 7:30 p.m., in multiple time zones.

A disadvantage with broadcasting pre-recorded television programs is that a viewer's interest in the program may diminish after the viewer has already watched the program or has otherwise learned of the outcome. In other words, for certain viewers, a given television program may be non-unique. For example, in the case of a game show, a viewer may have minimal interest in watching the same pre-recorded game show twice or watching a game show after learning of the outcome or answers to puzzles from a friend in another (later) time zone. Similarly, in the case of a sporting event, a viewer may have little interest in watching the sporting event if the event was aired earlier or otherwise pre-recorded and the viewer is already aware of the outcome. The same can be said for news broadcasts, situation comedies, and the like. Moreover, since content providers often cater to an extremely broad audience, it may be difficult to tailor the content of a given television program to a particular audience, demographic, or geographic region.

Recently, advances in television systems include viewer return channels. A return channel provides a way for a viewer to communicate back to a service provider. A television system which includes a return channel is referred to generally as interactive television.

An example of an implementation of a return channel is synchronized television. Companies, including GoldPocket Interactive of Medford, Mass., or Spiderdance, Inc., of Venice, Calif., have developed a synchronized television system (also known as a two-screen experience) in which a viewer may use a personal computer connected to the Internet to view a web-page that is synchronized to a particular pre-recorded television program. A disadvantage of the synchronized television configuration is that a viewer is required to operate a personal computer within a reasonable proximity of a television. Also, in a synchronized television configuration, a pre-recorded broadcast remains fixed and cannot be varied or changed over time or for different viewers.

Another company, Wink Communications, Inc., of Alameda, Calif., provides viewers with a return channel by way of a modem connected to a telephone line. In an interactive television system employing a modem, a viewer may use a remote control device and a set top box to communicate back to a service provider, usually in response to graphics that are displayed on the television screen. With this type of television system, a viewer may, for example, view news headlines on his or her television screen while watching a pre-recorded news broadcast or purchase a product while watching a commercial advertising that product.

It remains a disadvantage of the conventional broadcasting and interactive television systems, however, that broadcast programs are the same for all viewers, including repeat viewers and viewers in different time zones. Multiple broadcasts of a pre-recorded show in multiple time zones, or multiple broadcasts of the same show in a single time zone at different times, may render the program non-unique to certain users. This may cause viewers to lose interest in the show, as discussed above.

Moreover, in the case of a game show, multiple broadcasts of a non-unique show may give certain viewers an unfair advantage while playing along with the game show. For example, viewers may enjoy the challenge of trying to solve puzzles presented to pre-recorded contestants on a game show before the contestants are able to solve the puzzles. With an interactive television system, viewers may also be able to communicate responses to a scoring entity. However, since a pre-recorded game show may be broadcast in different time zones or at different times, a viewer in a later-airing time zone may have access to the puzzles and the answers to the puzzles before actually viewing the show or playing along with the show. Also, with access to a digital television recording medium, for example, the personal video recording system provided by TiVo, Inc., of San Jose, Calif., a viewer may be able to rewind a television program after hearing answers to puzzles. Accordingly, even though television viewers may have access to a return channel through which they may provide responses to game show puzzles and possibly even compete with other viewers based on those responses, a true competition may not be feasible.

In addition, it may be advantageous for a content provider to award prizes to viewers who play along with a game show in an interactive environment, for example, to entice more viewers or repeat viewers to play along with the show. However, some jurisdictions restrict the awarding of prizes for games of chance, but allow awards for games of skill. If answers to game show puzzles are sufficiently available before the game show is broadcast, then the show may be effectively reduced to a game of chance. Multiple viewers could have all of the correct answers without exhibiting any appreciable skill. Accordingly, there is a demand in the industry for an interactive broadcast format which avoids problems discussed above with respect to conventional interactive television systems.

SUMMARY OF THE DISCLOSURE

Therefore, it is an advantage of embodiments of the invention that a pre-recorded television program may be transmitted or broadcast with new, unique, and/or individualized content integrated into the program.

It is a further advantage of embodiments of the invention that a pool of content items may be integrated into broadcasts of pre-recorded television programs and displayed during the broadcast of the programs. The pool of content items may be sufficiently large such that different items from the pool will be displayed to different viewers. Accordingly, in some embodiments, two viewers may watch the same pre-recorded program, but the viewers will see different items from the pool displayed during the program. The pool of content items may comprise a variety of types of content or a combination of different types of content. The content may include, for example, news features, music videos, puzzles, video clips, or the like.

It is a further advantage of embodiments of the invention that a return channel may be employed so a viewer can communicate back to a content provider. In an interactive game show, for example, viewers may provide responses to puzzles in a pre-recorded game show and to puzzles from a pool of content items. In such an embodiment, the pool of content items may comprise, for example, a plurality of puzzles. The puzzles in the pool may each have an associated sort code with which to identify the puzzle's subject matter, the puzzle's level of difficulty, or the like.

There are many advantages to embodiments of the invention in which new puzzles are presented to viewers during a pre-recorded game show. For example, viewers may watch the same pre-recorded game show multiple times and still be presented with new puzzles to solve each time. Without new content or puzzles, viewers may have a low interest in watching a second broadcast of the same game show. In addition, in some embodiments, viewers may compete with other viewers interactively. If a viewer has already seen a pre-recorded program, or if the viewer otherwise has access to answers to the puzzles in the pre-recorded program, then the viewer may have an unfair advantage over other viewers. Accordingly, a competition employing only pre-recorded puzzles may not be feasible. By adding new puzzles to each broadcast, a viewer cannot gain an unfair advantage by learning the answers to the puzzles prior to a particular broadcast.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

The detailed description of preferred embodiments of the invention will be made with reference to the accompanying drawings wherein.

DETAILED DESCRIPTION OF PREFERRED EMBODIMENTS

The following detailed description is of the best presently contemplated mode of carrying out embodiments of the invention. This description is not to be taken in a limiting sense, but is made merely for the purpose of illustrating general principles of the invention. The scope of the invention is best defined by the appended claims.

The present invention relates to a system and method for integrating additional content into a broadcast of a pre-recorded television program such that different content items are displayed to different viewers. In some embodiments, for example, different puzzles may be integrated into a broadcast of a pre-recorded game show and displayed for different viewers. In these embodiments, each viewer or player may have a potentially unique game playing experience. In other embodiments, different news features may be integrated into a news program and displayed to different viewers. Indeed, embodiments of the invention may integrate many different types of content items into many different types of programs.

Figure 1:
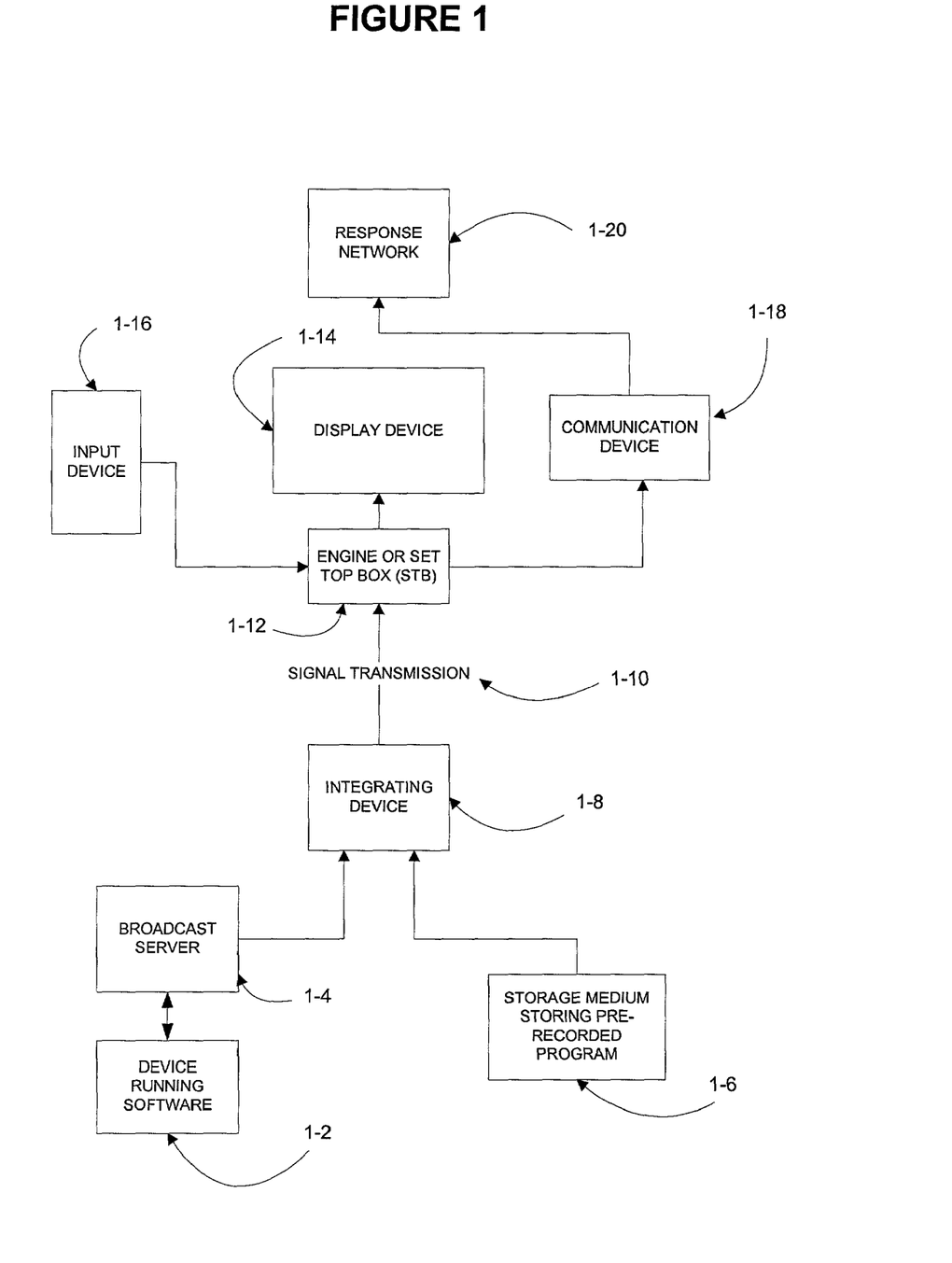
FIG. 1 shows a diagram of a hardware environment of an interactive television system with which embodiments of the invention may be implemented.

Embodiments of the invention may be implemented in a variety of hardware environments. By way of example, FIG. 1 shows a representative hardware environment according to an embodiment of the invention. The hardware environment in FIG. 1 may be described as an interactive television system. A software storage medium 1-2 stores software that works with a broadcast server 1-4 to create an interactive television application. A storage medium storing a pre-recorded program 1-6 provides this pre-recorded program to an integrating device 1-8 which integrates the interactive television application with the pre-recorded program. Following integration, the combined signal is transmitted or broadcast 1-10. In the example hardware environment in FIG. 1, an engine or set top box 1-12 receives the transmitted signal. The set top box 1-12 may display video on a display device 1-14, accept input from an input device (for example, a remote control or a keyboard) 1-16, and communicate over a communications device 1-18 to a response network 1-20.

An example embodiment of the invention is described with reference to a television game show called JEOPARDY!®. Other embodiments of the invention may employ other game shows or other television programs, such as a news program, a sports program, a situation comedy, or the like. The television game show JEOPARDY!® employs a trivia/quiz show format in which three contestants compete to solve puzzles that are assigned different point values. The puzzles are presented to the contestants by a game show host. The point values of the puzzles are awarded to the contestant who correctly solves the particular puzzle. JEOPARDY!® employs an answer/question format in which a puzzle consists of presenting an "answer" to the contestants, with the contestants providing the correct "question" for the answer. Ultimately, the contestant who has accumulated the highest score wins the game. JEOPARDY!® incorporates various nuances into this structure. For instance, the contestants can "bet" on a Double JEOPARDY!® or Final JEOPARDY!® question to increase their chances of winning the game.

In the context of conventional television broadcasting, JEOPARDY!® is a game show that is played by contestants in a television studio. The game show is recorded and broadcast to viewers at a later time. Since the game show is pre-recorded, it may be broadcast at the same time, for example at 7:00 p.m., in multiple time zones. In addition, the same pre-recorded game show may be broadcast multiple times in the same time zone.

An example embodiment of the invention allows viewers to play JEOPARDY!® interactively during the broadcast and to respond to puzzles that are different from puzzles to which others viewers are responding. An example embodiment provides for additional puzzles to be integrated into the pre-recorded JEOPARDY!® game show, giving viewers a potentially unique experience. Viewers may solve the puzzles presented to the contestants in an interactive environment and communicate solutions to those puzzles to a service provider by way of a return channel.

In the above example embodiment, viewers are presented with additional puzzles beyond the puzzles in the pre-recorded program. The additional puzzles may be presented to viewers, for example, in specified intervals or gaps provided in the program when the program is recorded or after it is recorded. A service provider receives viewer responses to properly answered contestants puzzles and to the additional puzzles, ascertains whether the responses are correct, and keeps score for the viewers. Accordingly, in an example embodiment, viewers may have a sensation of playing along with contestants on the pre-recorded broadcast, but viewers may not be limited to solving only the puzzles presented to the pre-recorded contestants. The additional puzzles presented during the broadcast will vary from viewer to viewer so that a viewer may have an experience that is different from another viewer's experience.

Figure 2:
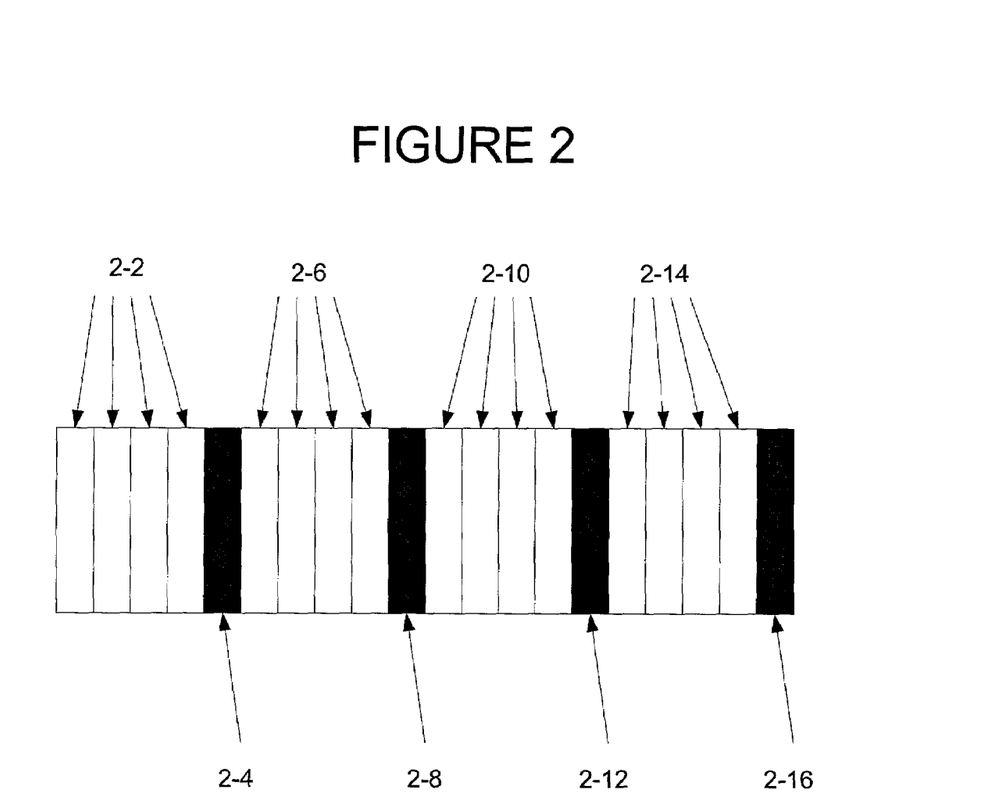
FIG. 2 shows a timeline diagram of a broadcast signal for a game show generated in accordance with an example embodiment of the invention.

Thus, the flow of a JEOPARDY!® game show in an example embodiment may proceed as is illustrated in the timeline in FIG. 2. In an example embodiment, contestants on the game show are presented with a series of puzzles 2-2, 2-6, 2-10, and 2-14 to solve, after which a specified interval or a gap 2-4, 2-8, 2-12, and 2-16 is provided in the broadcast show. As described below, when the show is broadcast at a later time, viewers are presented with one or more unique (or sufficiently unique) JEOPARDY!®-like puzzles to solve during the specified intervals or gaps 2-4, 2-8, 2-12, and 2-16.

In an embodiment illustrated in FIG. 2, after the specified interval or gap 2-4, for example, contestants are presented with a set of puzzles 2-6 to solve. The puzzles 2-6 are followed by another specified interval or gap 2-8, during which viewers are presented with one or more additional unique (or sufficiently unique) puzzles to solve. As shown in FIG. 2, this pattern may continue such that additional puzzles may be presented to viewers multiple times during the broadcast. Of course, the pattern for inserting additional puzzles shown in FIG. 2 is only an example of how additional puzzles may be inserted. Any other type of pattern could be employed without deviating from the scope or spirit of the invention, including, but not limited to, alternating contestant puzzles and unique (or sufficiently unique) puzzles, presenting all broadcast contestant puzzles first, or presenting all unique (or sufficiently unique) puzzles first.

In an example embodiment, a JEOPARDY!® game show may be produced and pre-recorded in the traditional manner. However, as discussed above, intervals or gaps may be provided in the pre-recorded program into which new content, such as additional puzzles, may be added. Intervals or gaps may be provided in a number of different ways. In one embodiment, when a game show is being recorded, a game show host may pause the game periodically to create a gap in which puzzles may be added later. In another embodiment, a game show may be produced in a traditional manner, and re-play of a recording may be paused periodically to provide gaps during which unique (or sufficiently unique) puzzles may be presented to viewers. In yet further embodiments, specified intervals in the broadcast may be replaced with additional puzzles for the interactive viewers. In further embodiments, additional puzzles may be overlaid onto the program, without employing specified intervals or gaps in the programming at all.

As discussed above, by inserting additional puzzles into specified intervals or gaps of a pre-recorded JEOPARDY!® program in an example embodiment, viewers may be presented with puzzles that did not appear in the pre-recorded program. In addition, embodiments of the invention allow viewers to be presented with puzzles that are different from puzzles presented to other viewers. This helps to insure (or, at least maximize the likelihood) that viewers are presented with at least some puzzles for the first time even if they are watching a re-broadcast of a game show. Thus, viewers may have at least a partially unique experience even during a repeat broadcast of the same show.

An example embodiment may be implemented on an interactive television system. In this context, interactive television refers to a system in which viewers watch a conventional television broadcast and are able to communicate to a content provider by way of a return channel. Other embodiments may be implemented in a connected environment in which viewers are connected to a content provider by way of a two-way data channel.

An example interactive television system is illustrated in FIG. 1. In the illustrated system, software 1-2 and a broadcast server 1-4 create enhanced television applications and manage the scheduling and insertion of enhanced television applications into a pre-recorded program. A pre-recorded television program 1-6 may be recorded, for example, in a conventional manner. An integrating device 1-8 integrates a pre-recorded television program 1-6 with enhancements to provide a combined signal. Following integration, the combined signal may be transmitted on a communication channel 1-10 by antenna, cable, satellite, or the like.

An engine 1-12 is employed at a viewer side to receive a combined signal and display the enhanced television application along with or in conjunction with the pre-recorded program. In an example embodiment, the engine comprises a set top box (STB) 1-12. Other suitable devices capable of receiving a broadcast and using software to interpret an enhanced television application broadcast may also be employed. A display device 1-14, such as a viewer's television, displays the program and the enhanced television application. An input device 1-16 may be employed by a viewer to communicate to the engine 1-12. In an example embodiment, the input device 1-16 may be a remote control device, or other suitable user input device, including, but not limited to, a keyboard, a voice-enabled STB, a mouse, or the like. In some embodiments, a communication device 1-18 may provide a return channel. The communication device 1-18 may be a modem connected through a telephone line, a two-way satellite link, or the like. A communication device 1-18 connects to a response network 1-20 which receives and aggregates viewer responses. In embodiments of the invention, the response network 1-20 may be a content provider or another entity which receives viewer responses for a content provider.

An example of an interactive television system, similar to the system described above, on which embodiments of the invention may be implemented is a system provided by Wink Communications, Inc., of Alameda, Calif. However, embodiments of the invention may be implemented in connection with other suitable interactive television systems.

An example embodiment of the invention is now described in detail. The example embodiment is described in connection with, for purposes of illustration, a JEOPARDY!® game show and an interactive television system as illustrated in FIG. 1. As discussed above, a variety of television shows and interactive television systems could be employed in other embodiments. In an example embodiment, a JEOPARDY!® game show may be pre-recorded. In this embodiment, after a game show has been recorded, a specified number of gaps are provided at regular intervals in the show. In other embodiments, the host of the show could pause the action of the game show periodically to create gaps into which additional puzzles may be integrated.

In the example embodiment, new puzzles are presented to viewers during gaps in the pre-recorded program. To accomplish this, a pool of puzzles is generated from which new puzzles may be selected. As is described in more detail below, in other embodiments, the pool may be other types of content items, such as a pool of news features, sports items, or the like. In the example embodiment, the pool is a large collection of JEOPARDY!®-like puzzles. In addition, in the example embodiment, puzzles in the pool may have associated sort codes for sorting the puzzles by desired criteria. For example, puzzles in the pool may be coded by level of difficulty, subject matter, or another suitable or desired criteria.

As discussed above, integrating additional puzzles into a pre-recorded game show may make the game show unique for some viewers. With a desired degree of probability, viewers should not be able to learn answers to puzzles in a show by watching the show twice or by obtaining answers from viewers who watched the program previously in another time zone. Accordingly, the pool of puzzles should be sufficiently large to give rise to a likelihood that, by randomly presenting puzzles from the pool to different viewers, viewers will have a unique (or sufficiently unique) experience. Accordingly, the appropriate size of the pool in the example embodiment depends on the number of viewers playing the JEOPARDY!® game interactively and on the acceptable level of puzzle repetition.

Figure 3:
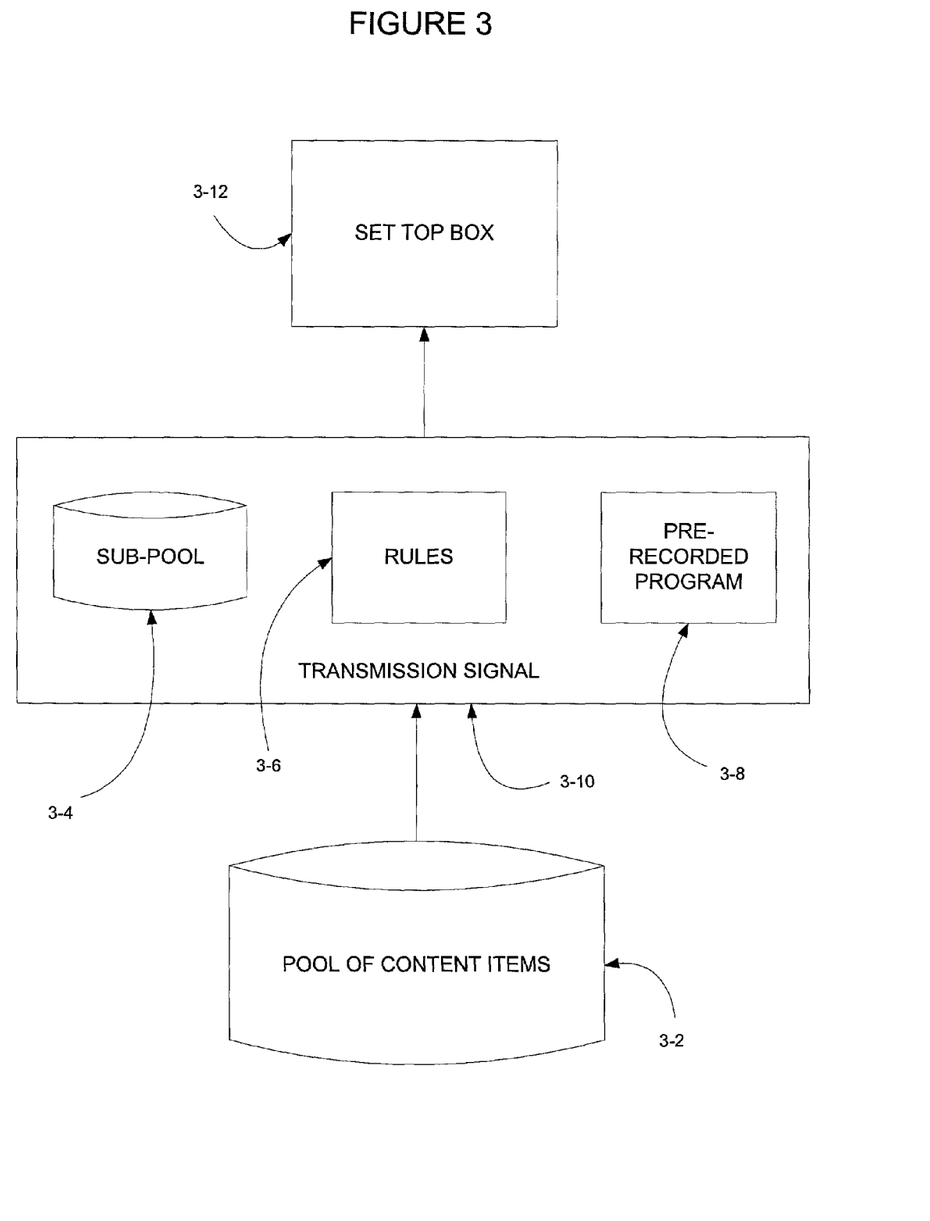
FIG. 3 shows a graphical representation of a method for providing a television broadcast in accordance with embodiments of the invention.

In the example embodiment, after a JEOPARDY!® program has been recorded and a pool of puzzles has been generated, some or all of the puzzles from the pool are integrated into a broadcast. In one embodiment, the entire pool may be integrated into the JEOPARDY!® broadcast. In other embodiments, as illustrated in FIG. 3, a sub-pool 3-4 of the pool 3-2 may be integrated into a broadcast. It may be desirable to integrate a sub-pool 3-4 of the pool 3-2 in order to avoid puzzle repetition or due to bandwidth limitations. Current broadcasting methods may limit the amount of information that may reasonably be integrated into a broadcast. Since a JEOPARDY!® game show may be broadcast to millions of households, the pool may need to be larger than could realistically be broadcast to each viewer.

Sub-pools of puzzles may be created a variety of different ways. For example, if puzzles in the pool have sort codes, such as associated levels of difficulty, a sub-pool may be composed of a particular number of difficult puzzles and a particular number of easy puzzles. In the JEOPARDY!® embodiment, sub-pools may be generated to correspond to a theme of a particular broadcast. For example, if a JEOPARDY!® broadcast has a college theme or a celebrity theme, then sub-pools may be comprised of puzzles related to the corresponding subject matter. In addition, sub-pools may be created such that different sub-pools are broadcast into different time zones so that puzzles are not repeated within a time zone.

In the example embodiment in FIG. 3, rules 3-6 are broadcast along with a sub-pool 3-4 and a pre-recorded program 3-8 as a single transmission signal 3-16. The rules 3-6 may describe which content items in the sub-pool 3-4 are displayed to viewers and when the items are displayed. Rules may vary depending on a desired result or a particular embodiment. Some rules may, for example, provide that puzzles be presented in a specified order and in each of a series of specified intervals or gaps in a pre-recorded program. In addition, rules may provide for a certain number of easy puzzles and a certain number of difficult puzzles to be presented. Rules may also provide that a puzzle may only be presented one time to a particular viewer.

In a further example embodiment, rules may provide for puzzles to be selected randomly (or pseudo-randomly) from a sub-pool for display. For example, rules may employ an algorithm used to select puzzles from a sub-pool, where the algorithm employs a random number generator. Random number generators generally require a user to specify an initial value or a seed. Although random number generators do not generate truly random numbers, initializing a random number generator with different seeds may generate different sequences of pseudo-random numbers. Accordingly, in further embodiments, a random generator may use a variety of numbers as a seed, such as an STB serial number, a viewer ID number, a viewer's phone number, or the like.

In yet further embodiments, rules may provide for variations in the order of multiple choice answers to multiple-choice puzzles. In another embodiment, a variety of wrong answers may be provided to a corresponding question. Rules may provide for a pseudo-random selection of, for example, three wrong answers from a group of 10 wrong answers to present along with a correct answer. Indeed, in further embodiments, rules may be used in a variety of ways to enhance the uniqueness of puzzles presented to a viewer.

In an example embodiment in FIG. 3, a sub-pool of puzzles 3-4, along with rules 3-6 corresponding to the particular sub-pool 3-4, are integrated into a pre-recorded program 3-8 to create a combined transmission signal 3-16. Following integration, the program is broadcast or otherwise transmitted by a content provider. A content provider may be, for example, a satellite TV provider, a local network affiliate, a cable TV provider, or the like. Accordingly, the transmission or broadcast may be by antenna, cable, satellite, or the like.

In an example embodiment in FIG. 3, the transmission signal 3-16 is received by a viewer's STB 3-12. The STB 3-12 may contain software, hardware, firmware, or the like, which controls a display device, such as a television, to display the television program and additional content items. The software in the STB may be resident in the box, it may be transmitted with the combined signal, and it may also be updated by the combined signal. The software, or other suitable programming, will enable the STB to interpret the transmitted signal, to interpret the rules transmitted with the signal, and to use the rules to display additional content items.

Accordingly, in an example embodiment, a viewer's STB selects and presents puzzles at appropriate times during a broadcast of the pre-recorded program according to integrated rules. The puzzles may be displayed graphically on the viewer's television. Alternatively or in addition, the puzzles may be presented audibly. In further embodiments, video clips may present the additional puzzles the same way puzzles are presented in an actual JEOPARDY!® program.

In an example embodiment, viewers may be prompted to choose from four possible answers to a puzzle, one of which is the correct answer. A viewer may respond using a viewer-input device, such as a remote control device. A viewer response may be received by the STB and forwarded to a response network via a return channel, which may be a modem connected to a telephone line. Other embodiments may employ other viewer-input devices and other types of return channels.

At the conclusion of a program in an example embodiment, viewers who played the interactive JEOPARDY!® game show may have responded to the pre-recorded puzzles as well as to puzzles from the sub-pool. In an example embodiment, a response network collects and aggregates viewer responses. In other embodiments, another entity, such as a content provider itself, may receive communications via a return channel and tabulate viewer responses. Following a tabulation of viewer scores, an example embodiment awards prizes to viewers who achieved the highest scores. In other embodiments, names of viewers who achieved high scores may be displayed on subsequent broadcasts. In yet further embodiments, other types of recognition or rewards may be given to high scoring viewers, including, but not limited to, non-monetary points, coupons, or the like.

Thus, example embodiments of an interactive JEOPARDY!® game show may be played by viewers across different time zones, by viewers watching a program at different times, and by viewers who may rewind the program, without a disadvantage of some viewers having advance knowledge of the puzzles or the answers. As discussed above, a viewer in an example embodiment may score points by accurately responding to both pre-recorded puzzles as well as unique (or sufficiently unique) puzzles. Accordingly, a viewer may have a sensation of playing along with pre-recorded contestants while also responding to new puzzles that are different from the pre-recorded puzzles. In some embodiments, various puzzles may be given different scores in order to insure the integrity of the contest. Since pre-recorded puzzles, and the answers thereto, are susceptible to being known prior to transmission of a program, a viewer may score fewer points for responding to a pre-recorded puzzle correctly than for responding to one of the additional puzzles from the sub-pool correctly. Examples of this type of prizing architecture are described more thoroughly in co-pending patent application Ser. No. 10/134,156, filed Apr. 25, 2002, which is incorporated herein by reference.

Although example embodiments are described with respect to a JEOPARDY!® game show, other embodiments of the invention may employ other game show formats. For example, another embodiment could employ the game show format for WHO WANTS TO BE A MILLIONAIRE®. In this game show format, contestants are asked a series of progressively more difficult questions, the contestants being permitted to advance to the next question only after answering a prior question correctly. A viewer could "play along" with a contestant by, for example, responding to the same questions to which the contestants are called upon to respond. In addition, a sub-pool of additional questions may be integrated into a broadcast so that a viewer may also be prompted to respond to additional unique questions. The sub-pool of questions may be created such that a viewer would progress to successively more difficult questions with each correct answer. Prizes may be awarded to viewers who correctly respond to a particular number of questions. The prizes may also be tied to, for example, a viewer answering questions presented in the pre-recorded show correctly.

Further embodiments may employ other game show formats. Virtually any trivia-based game show could be implemented as described above. Other types of game show formats, such as WHEEL OF FORTUNE®, may be employed in further embodiments. In WHEEL OF FORTUNE®, contestants solve word puzzles by guessing which letters comprise a word or phrase. If a contestant guesses a letter that appears in the particular word or phrase, then that letter is displayed where it would appear in the word or phrase. The contestants then guess the word or phrase based on the displayed letters. In an embodiment employing a WHEEL OF FORTUNE® format, those types of puzzles may be integrated into a broadcast as described above. For example, puzzles in the sub-pool may consist of words or phrases with certain letters omitted, with the challenge being for the viewer to guess the word or phrase. Points may be awarded to a viewer based on the number of correct answers, the time taken to input answers, or a combination thereof. Further embodiments may employ other game show formats, such as THE WEAKEST LINK®, HOLLYWOOD SQUARES®, THE PRICE IS RIGHT®, FAMILY FEUD®, or the like.

While example embodiments are described in the context of interactive game shows, other embodiments may involve television shows that are not game shows or that are not interactive. For example, instead of broadcasting a game show with a sub-pool of puzzles, other embodiments may transmit or broadcast various types of unique content with various types of programs. For example, another embodiment of the invention may employ a format of a news program. A sub-pool of news features may be broadcast with a pre-recorded national news program. In such an embodiment, a viewer's STB may employ rules integrated with the news program to determine which news features from the sub-pool to present to a particular viewer. In other embodiments, viewers may express preferences which may be determinative of which additional and unique content is displayed. For example, a pre-recorded news program may be broadcast with a sub-pool of news features, which sub-pool includes features about current events, sports, entertainment, and the like. If a viewer has specified an interest in ice hockey, for example, through a user input device as discussed above or in a pre-registration procedure, then the viewer's STB may display ice hockey features during the pre-recorded news program.

Other embodiments of the invention may employ an entertainment show format, such as ENTERTAINMENT TONIGHT®. In such an embodiment, a sub-pool of entertainment related features may be broadcast along with a pre-recorded program. The sub-pool may include features about actors and actresses, musicians, models, and the like. User information stored in an STB may determine which features from the sub-pool to present to a viewer during the pre-recorded program. Accordingly, a viewer could have a unique or sufficiently unique experience, even while watching the same show for a second time. Also, in such an embodiment, a television program could be tailored to a particular viewer's tastes, or to tastes or standards of a particular geographic region.

Embodiments of the invention may individualize virtually any pre-recorded television program to give a viewer a sufficiently unique or different experience. By integrating a pool of content items and rules regarding how to use the content, with a pre-recorded television show, a viewer's STB may present new content at specified times during the pre-recorded program. Since the additional content is selected from a pool of content items, different viewers may see different content items during the same program.

The embodiments disclosed herein are to be considered in all respects as illustrative and not restrictive of the invention. The scope of the invention is indicated by the appended claims, rather than the foregoing description. All changes that come within the meaning and range of equivalency of the claims are therefore intended to be embraced therein.

What is claimed is:

1. A method of providing a television broadcast that displays different content to different viewers comprising:
   associating a pool of content items with corresponding sort codes for sorting the pool of content items by desired criteria;
   sorting the pool of content items according to the sort codes to generate at least a first sub-pool of content items having a first group of similar sort codes and a second sub-pool of content items having a second group of similar sort codes;

periodically creating a gap in a television program carried in the television broadcast;

integrating the pool of sorted content items with a signal for the television program to create a combined signal, and integrating presentation rules with the combined signal;

where in said integrating includes inserting additional pools of sorted content items into the created gap in the television program;

transmitting the combined signal;

selecting and displaying at least one of the content items from the first sub-pool to a first viewer during a broadcast of the television program; and selecting and displaying at least one different content item from the second sub-pool to a second viewer during a broadcast of the television programs, wherein the content items displayed to the first viewer and to the second viewer are selected based on the presentation rules, and wherein the rules provide that the items in the pool are pseudo-randomly displayed to the first viewer and the second viewer.

2. A method of providing a television broadcast according to claim 1, wherein the method further comprises:

receiving a communication from the first viewer wherein the communication is associated with at least one content item from the sub-pool displayed to the first viewer.

3. A method of providing a television broadcast according to claim 2, wherein receiving a communication from the first viewer comprises:

displaying at least one content item to the first viewer pursuant to which the first viewer is prompted to respond;

employing a return channel by which the first viewer communicates a response; and accepting a response from the first viewer through the return channel.

4. A method of providing a television broadcast according to claim 3, wherein displaying at least one content item from the pool to the first viewer pursuant to which the first viewer is prompted to respond comprises displaying a puzzle.

5. A method of providing a television broadcast according to claim 4, wherein the puzzle is a multiple-choice puzzle.

6. A method of providing a television broadcast according to claim 3, wherein accepting a response from the first viewer comprises recognizing a communication from the first viewer in which the first viewer employs a remote control device for the communication.

7. A method of providing a television broadcast according to claim 3, wherein the return channel is a modem connected to a telephone line.

8. A method of providing a television broadcast according to claim 1, wherein each sort code of the sort codes corresponds to a theme of a subject matter of each content item of the pool of content items.

9. A method of providing a television broadcast according to claim 1, wherein the pool of content items includes a plurality of puzzles, and wherein each sort code for each of the plurality of puzzles identifies a degree of difficulty of each respective puzzle.

10. A method of providing a television broadcast according to claim 1, wherein the pool of content items comprises a sufficiently large number of items such that it is unlikely that an item would be displayed both to the first viewer and the second viewer when the items are pseudo-randomly selected for displaying during a broadcast of the television program.

11. A method of providing a television broadcast according to claim 1, wherein the pool of content items includes a plurality of puzzles.

12. A method of providing a television broadcast according to claim 1, wherein integrating a pool of content items comprises:

identifying items in the pool of content items having a desired property; and forming a sub-pool by selecting a plurality of identified items.

13. A method of providing a television broadcast according to claim 12, wherein different sub-pools are integrated into broadcasts of television programs in different time zones.

14. A method of providing a television broadcast according to claim 1, wherein the rules provide that an item in the pool is displayed at most one time to the first viewer or the second viewer.

15. A method of providing a television broadcast according to claim 1, wherein the rules provide that an item in the pool is displayed to the first viewer or the second viewer at a particular time during the broadcast of the television program.

16. A method of providing a television broadcast according to claim 1, wherein the television program contains at least one specified interval or gap during which a content item from the pool is displayed to the first viewer or the second viewer.

17. A method of providing a television broadcast according to claim 1, wherein the television program is a game show.

18. A method of providing a television broadcast according to claim 1, wherein transmitting the combined signal comprises broadcasting the combined signal by satellite television transmission.

19. A method of providing a television broadcast according to claim 1, wherein transmitting the combined signal comprises broadcasting the combined signal by cable television transmission.

20. A system for providing a television broadcast in which different content is displayed to different viewers wherein the system comprises:

a storage medium that stores a pre-recorded television program;

a storage medium that stores a pool of content items;

a sorting device that associates the pool of content items with corresponding sort codes for sorting the pool of content items by desired criteria, said sorting device operating to sort the pool of content items according to the sort codes to generate at least a first sub-pool of content items having a first group of similar sort codes and a second sub-pool of content items having a second group of similar sort codes;

an integrating device that periodically creates a gap in the pre-recorded television program and integrates at least a portion of the pool of sorted content items with the pre-recorded television program to create a combined signal, wherein said integrating device inserts additional pools of sorted content items into the created gap in the pre-recorded television program;

a transmitting device that transmits the combined signal;

a first engine that receives the combined signal and selects and displays at least one item from the first sub-pool of content items to a first viewer; and a second engine that receives the combined signal and selects and displays a different item from the second sub-pool of content items to a second viewer, wherein the integrating device also integrates presentation rules with a signal for the pre-recorded television program, wherein the content items displayed to the first viewer and to the second viewer are selected based on the presentation rules, and wherein the rules provide that the items in the pool are pseudo-randomly displayed to the first viewer and the second viewer.

21. A system for providing a television broadcast according to claim 20, wherein the system further comprises:
a response network that receives a communication from the first viewer wherein the communication is associated with at least one content item from the sub-pool displayed to the first viewer.

22. A system for providing a television broadcast according to claim 21, wherein the response network receives the communication by way of return channel.

23. A system for providing a television broadcast according to claim 22, wherein the communication is a response by the first viewer to the at least one content item from the pool displayed to the first viewer and wherein the at least one content item is a puzzle.

24. system for providing a television broadcast according to claim 23, wherein the puzzle is a multiple-choice puzzle.

25. A system for providing a television broadcast according to claim 23, wherein the communication is generated by a remote control device.

26. A system for providing a television broadcast according to claim 22, wherein the return channel is a modem connected to a telephone line.

27. A system for providing a television broadcast according to claim 20, wherein each sort code of the sort codes corresponds to a theme of a subject matter of each content item of the pool of content items.

28. A system for providing a television broadcast according to claim 20, wherein the pool of content items includes a plurality of puzzles, and wherein each sort code for each of the plurality of puzzles identifies a degree of difficulty of each respective puzzle.

29. A system for providing a television broadcast according to claim 20, wherein the pool of content items comprises a sufficiently large number of items such that it is unlikely that an item would be displayed both to the first viewer and to the second viewer when the items are pseudo-randomly selected for displaying during a broadcast of the pre-recorded television program.

30. A system for providing a television broadcast according to claim 20, wherein the pool of content items includes a plurality of puzzles.

31. A system for providing a television broadcast according to claim 20 wherein the first sub-pool comprises content items having a first desired property, and the second sub-pool comprises content items having a second desired property.

32. A system for providing a television broadcast according to claim 31, wherein different sub-pools are integrated into broadcasts of television programs in different time zones.

33. A system for providing a television broadcast according to claim 20, wherein the rules provide that an item in the pool is displayed at most one time to the first viewer or the second viewer.

34. A system for providing a television broadcast according to claim 20, wherein the rules provide that an item in the pool is displayed to the first viewer or the second viewer at a particular time during the broadcast of the television program.

35. A system for providing a television broadcast according to claim 20, wherein the television program contains at least one specified interval or gap during which a content item from the pool is displayed to the first viewer or the second viewer.

36. A system for providing a television broadcast according to claim 20, wherein the television program is a game show.

37. A system for providing a television broadcast according to claim 20, wherein the transmitting device is a device for broadcasting the combined signal by satellite.

38. A system for providing a television broadcast according to claim 20, wherein the transmitting device is a device for broadcasting the combined signal by cable television.

39. A method of selecting content items in a television program that displays different content to different viewers comprising:
(a) receiving a combined signal which combines a pool of sorted content items with a signal for the television program,
wherein the pool of content items is associated with corresponding sort codes for sorting the pool of content items by desired criteria,
wherein the pool of content items is sorted according to the sort codes to generate at least a first sub-pool of content items having a first group of similar sort codes and a second sub-pool of content items having a second group of similar sort codes,
wherein gaps are periodically created in a television program carried in a television broadcast, and
wherein presentation rules are integrated with the combined signal;
(b) viewing at least one of the content items selected from the first sub-pool by a first viewer during a broadcast of the television program; and
(c) viewing at least one different content item selected from the second sub-pool by a second viewer during a broadcast of the television program,
wherein the content items displayed to the first viewer and to the second viewer are selected based on the presentation rules, and
wherein the rules provide that the items in the pool are pseudo-randomly displayed to the first viewer and the second viewer.

40. A method of selecting content items in a television program according to claim 39, wherein additional pools of sorted content items are inserted into respective gaps in the television program.

41. A method of selecting content items in a television program according to claim 39, wherein the pool of content items comprises a sufficiently large number of items such that it is unlikely that a content item would be viewed both by the first viewer and by the second viewer when the items are pseudo-randomly selected for displaying during a broadcast of the television program.

* * * * *